US007804182B2

(12) United States Patent
DeAngeles

(10) Patent No.: US 7,804,182 B2

(45) Date of Patent: Sep. 28, 2010

(54) SYSTEM AND PROCESS FOR GENERATING HYDROELECTRIC POWER

(76) Inventor: Steven J. DeAngeles, 200 S. Michigan Ave., Suite 830, Chicago, IL (US) 60604

( * ) Notice: Subject to any disclaimer, the term of this patent is extended or adjusted under 35 U.S.C. 154(b) by 431 days.

(21) Appl. No.: 11/998,360

(22) Filed: Nov. 30, 2007

(65) Prior Publication Data

US 2009/0140523 A1 Jun. 4, 2009

(51) Int. Cl.
*F03B 13/00* (2006.01)
*H02P 9/04* (2006.01)

(52) U.S. Cl. .............................. 290/43; 290/54; 290/53

(58) Field of Classification Search ................... 290/42, 290/43, 53, 54; 416/85; 60/495, 496, 497, 60/501, 505, 698, 502, 398; 417/331, 333
See application file for complete search history.

(56) References Cited

U.S. PATENT DOCUMENTS 3,030,893 A * 4/1962 Shaffer ....................... 417/331
3,992,881 A * 11/1976 Scherrer ...................... 60/398
4,031,702 A 6/1977 Burnett et al.
4,055,950 A 11/1977 Grossman
4,321,475 A * 3/1982 Grub ........................... 290/52
4,380,419 A 4/1983 Morton
4,398,095 A * 8/1983 Ono ............................ 290/53
4,426,846 A 1/1984 Bailey
4,454,429 A * 6/1984 Buonome .................... 290/53
5,243,224 A 9/1993 Tagney
5,377,485 A 1/1995 Bellamy
6,041,596 A 3/2000 Royer
6,546,723 B1 4/2003 Watten et al.

(Continued)

FOREIGN PATENT DOCUMENTS

JP 03294662 A * 12/1991

(Continued)

OTHER PUBLICATIONS

Non final Office Action mailed Sep. 14, 2009, U.S. Appl. No. 11/627,008.

*Primary Examiner*—Julio Cesar Gonzalez
(74) *Attorney, Agent, or Firm*—Kelly & Krause, L.P.; Joseph P. Krause

(57) ABSTRACT

A system and process for generating hydroelectric power within a body of water relying on the pressure head existing between two depths of the water. A vertically arranged conduit or penstock has an upper water intake and is in fluid communication with a reservoir situated at a lower depth. In a first cycle, water flow is established in the conduit or penstock between the water intake and lower reservoir when the reservoir is substantially full of air. A turbine housing is mounted adjacent the reservoir at a lower depth than the water intake and houses an electric turbine generator having blades mounted within the conduit or penstock to be driven by the flow of water to generate electricity. As water is introduced into the reservoir, air is exhausted out an air exhaust tube to a point above the surface of the body of water. After the reservoir is generally full of water valves are provided to cease the flow of water through the water intake and flow of air out the exhaust tube. An air pump thereafter introduces air into the reservoir to force water out of a reservoir water outlet port. The generating cycle is then repeated.

13 Claims, 2 Drawing Sheets

U.S. PATENT DOCUMENTS

| | | | | |
|---|---|---|---|---|
| 6,718,761 | B2 * | 4/2004 | Merswolke et al. | 60/398 |
| 6,861,766 | B2 | 3/2005 | Rembert | |
| 7,299,628 | B2 * | 11/2007 | Buller | 60/398 |
| 2002/0144504 | A1 * | 10/2002 | Merswolke et al. | 60/398 |
| 2002/0148222 | A1 | 10/2002 | Zaslavsky et al. | |
| 2006/0032374 | A1 * | 2/2006 | Vrana et al. | 95/258 |
| 2007/0214780 | A1 * | 9/2007 | Walters | 60/398 |

FOREIGN PATENT DOCUMENTS

| | | | |
|---|---|---|---|
| SU | 635167 A | * | 11/1978 |

* cited by examiner

SYSTEM AND PROCESS FOR GENERATING HYDROELECTRIC POWER

BACKGROUND OF THE INVENTION

1. Field of the Invention

This invention relates in general to hydroelectricity and, more particularly, to a system and method for generating hydroelectric power in an efficient and environmentally clean manner.

2. Summary of the Prior Art

In the prior art there have been numerous attempts to develop satisfactory techniques of efficiently generating electricity without pollution. Many prior systems have relied on energy inherent in nature, including the forces found in atmospheric winds and the of energy created by water flowing in rivers, over dams, and the pressure differentials present at the depths of bodies of water, such as in oceans, seas, bays, lakes, and the like. It is the objective in the prior art when attempting to rely on nature to provide the energy for the generation of electricity to do for reasons of economy, efficiency, and minimization of pollution, such as created by environmentally harmful fossil fuels and the potential problems associated with nuclear energy.

In some prior art power generators, attempts have been made to employ the energy potential present in a head of water to generate hydroelectric power. In general, prior designs relying on pressure differential have not attained an optimum level of power generation as is desired in the industry. An example of a known technique for generating electric power relying on the energy potential of a pressure head in a body of water is disclosed in U.S. Pat. No. 4,321,475 issued Mar. 23, 1982 to Grüb. The technique taught in Grüb is subject to certain inefficiencies involving the vertical lifting of water and other design flaws. It is desirable, therefore, to provide an improved system and method for generating hydroelectric power that is relatively efficient and economical to maintain and operate.

SUMMARY OF THE INVENTION

It is accordingly an objective of this invention to provide an improved and economical system and method for the generation of hydroelectric power. The system and process herein disclosed extracts energy from the pressure head present in a body of water, such as, for example, from an ocean, sea, bay, lake and the like. Although the invention can operate at any depth within body of water, depths of greater than 100 feet are preferred for best efficiencies.

The system herein includes an upper submerged inlet port of a vertical conduit or penstock that is selectively in fluid communication with a sealed air filled reservoir positioned at a lower depth of the body of water. The blades of a turbine generator of known design are positioned within the penstock or conduit in series with the reservoir so that energy produced by a head of water drives the blades of the electric generator at great velocity for generating hydroelectric power. The flow of water is created by opening fluid control means to the reservoir at the same time fluid control means in the intake port is opened. The water flow continues to drive the turbine generator until such time as the reservoir is generally filled with water as the level of water reaches a selected point. The air within the reservoir is pushed out through an air outlet tube during water flow process. Air pump means in fluid communication with the reservoir acts to drive out the collected water through a reservoir egress after the system fluid control means that opened during generation cycle are closed. After evacuation of the water from the reservoir, the system is ready for another cycle. To increase power output, multiple reservoir chambers and conduits are used to provide more continuing operation of the system

DESCRIPTION OF THE PREFERRED EMBODIMENTS

Figure 1:
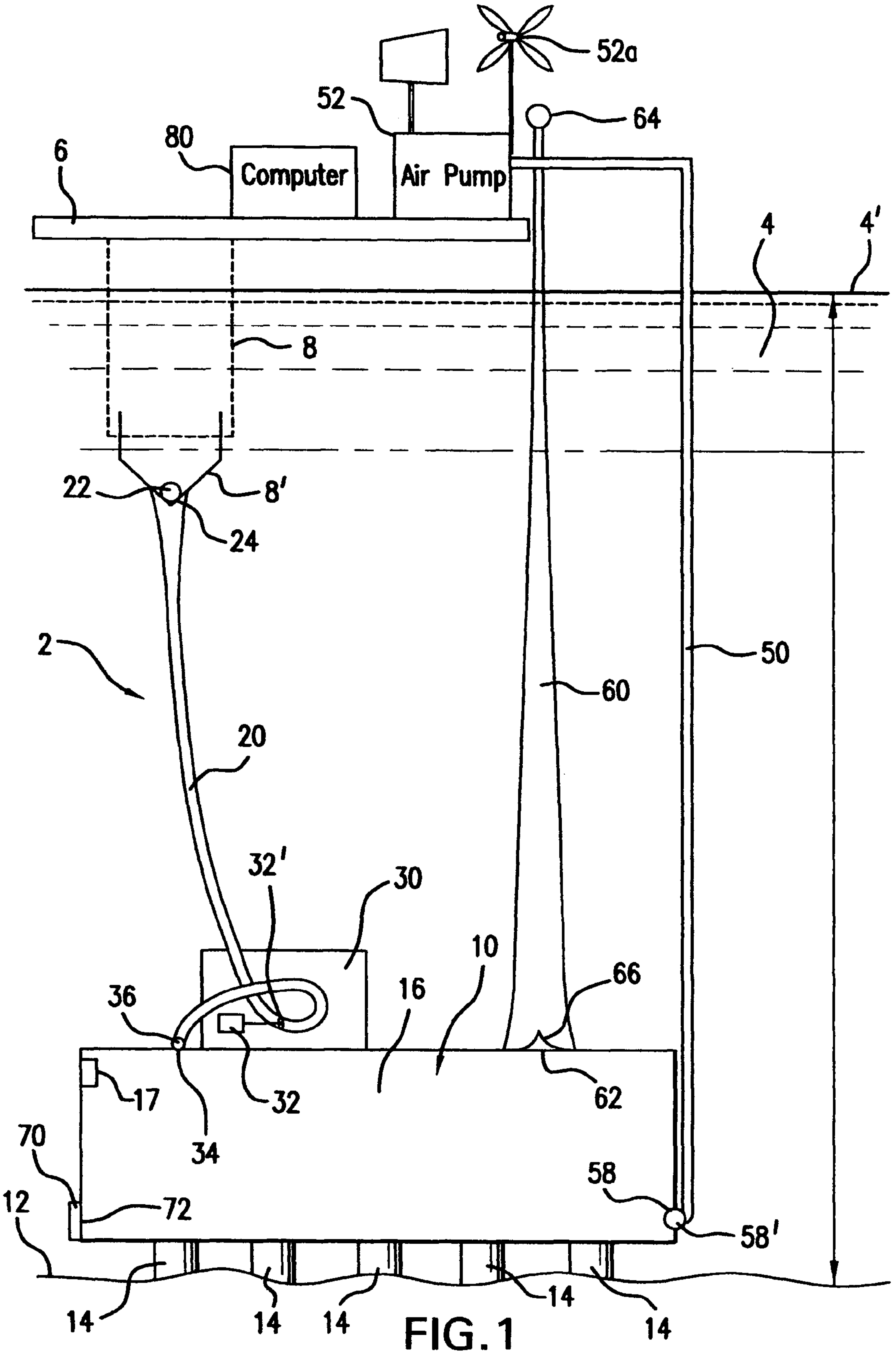
FIG. 1 is a side elevational view of the system for generating hydroelectric power of the invention.

Referring to FIG. 1, there is illustrated a first embodiment of the system for generating hydroelectric power in accordance with the invention, generally designated by reference numeral 2. The system 2 uses components submerged in a body of water 4, such as an ocean, lake, sea, bay and the like, that extract the energy derived from the pressure head present at a predetermined depth. An upper platform 6 is mounted above the water surface 4' at a selected height. The platform 6 can comprise any known platform design that employs support columns (not shown) extending to the floor of the body 4 of water. Other methods of supporting the platform 6 may be employed, whether structural or using flotation means. The platform 6 carries a plurality of downward extending cable attachments 8, such as, for example, four or more in number. Other support devices such as struts and the like may be used in place of the cables 8. The cables 8 support an enlarged water intake 8' at a position submerged beneath the surface 4' of the body of water 4. A sealed reservoir 10 is supported on the bottom 12 of the body 4 of water by legs or pillars 14. The reservoir 10 is sealed to retain air within its interior chamber 16. As will be described later herein, the chamber 16 is designed to be substantially filled with water during the power generating cycle of system 2 after which the water is removed from chamber 16 by air pressure to complete the operating cycles of the system 2. The selected capacity of reservoir 10 is dependent on numerous physical factors, including, but not limited to the desired output and efficiency of system 2. For example, the reservoir 10 may have capacity of twenty million gallons, although a smaller or larger capacity may be employed dependent on desired results.

A generally vertical conduit or penstock 20 is selectively in fluid communication with a port 22 provided in the lower portion of inlet water intake 8'. The conduit or penstock 20 may comprise either a flexible or rigid structure. An electrically controlled valve 24 is operatively mounted in port 22 to control the flow of water into the conduit or penstock 20. A sealed turbine housing 30 having an air filled interior is mounted adjacent the reservoir 10 and receives a portion of the downward extending conduit or penstock 20 with suitable sealing between the interior of housing 30 and the surrounding water. An electric turbine generator 32 of conventional design is suitably mounted exteriorly of the portion of conduit or penstock 20 within the turbine housing 30. The electric turbine 32 generates electric power through the rotation of turbine blades 32' that are mounted within the conduit or penstock 20 and drive the generator in a known manner. As should be appreciated, multiple electric turbine generators (not shown) may alternatively be positioned within turbine housing 30 and each may have turbine blades within the conduit or penstock 20 to generate electricity in concert with each other. The conduit or penstock 20 passes in and out of the turbine housing 30 and is in selective fluid communication with an intake port 34 of reservoir 10. A flow valve 36 is provided in operative relationship to intake port 34 to selectively allow flow through conduit or penstock 20 and drive the turbine generator 32. Suitable electric lines (not shown) are connected to turbine generator 32 and distribute the generated electricity to a distribution system (not shown) situated at suitable exterior location from system 2.

The reservoir 10 is intended to be positioned at a depth of about 300-500 feet beneath the water intake 8' so as to generate a large flow of water through conduit or penstock 20 created by the significant pressure differential existing between the air filled chamber 16 and the water intake 8' as result of the pressure head of water existing above the reservoir 30. The water entering intake 8' falls from a great height to the air filled reservoir at a large rate of flow through the conduit or penstock 20. It is within the scope of the invention to situate the reservoir 10 above or below the range of 300-500 feet dependent on the body of water and the desired efficiency and power to be generated. From the foregoing it should be apparent that a flow of water is attained through conduit or penstock 20 when valves 24 and 36 are opened at essentially the same time. An air inlet tube 50 that may be carried by platform 4 is operatively connected at its upper end above the surface 4' of the body of water to an air pressure pump 52 that is mounted on platform 4. The air pressure pump 52 can be a conventional device driven by wind mill vanes 52*a*. Alternatively, the air pump 52 may be driven by solar energy, a fossil fuel, or by using a portion of the electricity generated by turbine generator 32 of system 2 through an electric connection line (not shown). The air inlet tube 50 extends downward and is coupled in fluid communication with the chamber 16 of reservoir 10 by an inlet port 58 having a one way valve 58'. An air outlet tube 60 is connected to an air outlet port 62 of reservoir 10 and extends upward in connected relationship to platform 6 to an air outlet 64 to exhaust air from reservoir 10 during the electricity generating cycle. A valve 66 is mounted in reservoir port 62 which opens in concert to the opening of valves 24 and 36. An electrically powered door 70 which opens and closes a water outlet 72 is mounted on reservoir 10 for emptying chamber 16 after it has been generally filled with water following the electricity generating cycle, as determined by level detector 17. The sliding door 70 alternatively can comprise a conventional valve if desired. A conventional computer device 80 is mounted on platform 4 and is electrically connected to electrically operated to valves 24, 36, 58' and 66, sliding door 70, the controls of air pump 52 and to level detector 17 to open and close the valves and operate the air pump 52 in accordance with the sequence of operation of the invention.

In operation, during a non-generating cycle with the reservoir 10 containing water after an electricity generating cycle, the air pump 52 is actuated by computer 80 and pumps air at a predetermined pressure through air inlet tube 50 and into the chamber 16. At the same time sliding door 70 opens port 72 while valves 24, 36 and 66 remain closed. The air flow created by pump 52 forces the water out of the chamber 16 through water outlet 72. Once the reservoir is substantially filled with air, the port 72 is closed by sliding door 70 to seal the chamber 16 while the air pump 52 ceases operation with valve 58' closing. It is not necessary, however, to force all of the water out of the reservoir 10. The valves 24, 36, and 66 thereupon are opened at generally the same time. Water rapidly falls into water intake 8' and downward through conduit or penstock 20. The water flow through the conduit or penstock 20 enters the turbine housing 30 to drive the turbine blades 32' thereby generating electricity. Subsequently, the water falls into chamber 16 forcing air out through air outlet tube 60. The air outlet tube 60 may be tapered to increase the air flow rate through the tube so that the stream of air from air outlet 64 can be used to rotate the windmill vanes 52' to charge the air pump 52 in known manner. Once the reservoir 10 is substantially filled with water as determined by water level detector 17, the valves 24, 36 and 66 are closed and the previous cycle of forcing water from the reservoir 10 is repeated. It should be clear that the system 2 provides successive cycles of power generation and removal of water from the chamber 16 to complete the process of generation.

Figure 2:
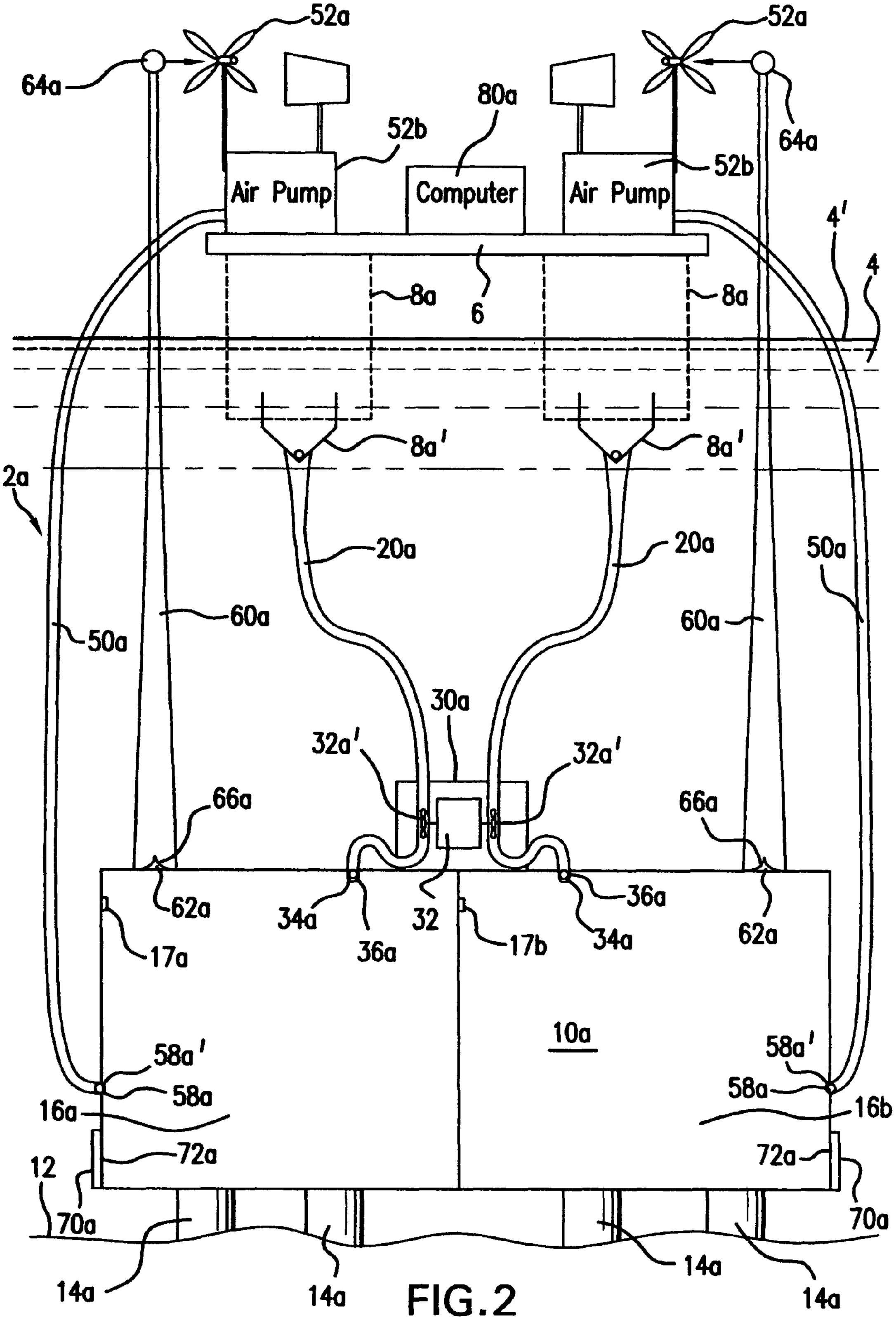
FIG. 2 is a side elevational view of the invention for generating hydroelectricity employing a plurality of water flows.

Referring now to FIG. 2, there is illustrated a second embodiment of the invention, generally designated by reference numeral 2*a*. For a greater and more continuous power output, the system 2*a* establishes a plurality of water flows to generate electricity in two successive cycles, such as two separate flows as shown in FIG. 2. If desired, it is within the scope of the invention to run the redundant components of FIG. 2 generally simultaneously if desired. It should further be clear that system 2*a* could be modified further by employing more than two conduits establishing more than two water flows to generate electricity.

In FIG. 2, an upper platform 6*a* is elevated above the water surface 4' at a selected height. Cables 8*a* support a pair of enlarged water intakes 8*a'* beneath the surface 4' of the body of water. A sealed reservoir 10*a* is mounted on the bottom 12 of the body of water by legs or pillars 14*a*. The reservoir 10*a* is sealed to selectively contain air within a pair of interior chambers 16*a*, 16*b*. A wall 18*a* divides the interior of the reservoir 10*a* to create the chambers 16*a*, 16*b*. As will be described later herein, the chambers 16*a*, 16*b* are designed to be substantially filled with water on a successive basis during the power generating cycles of system 2*a* after which the water is removed from either chamber 16*a*, 16*b* by air pressure to complete alternate operating cycles of the system 2*a*. As described in connection with the description of the first embodiment of FIG. 1, the selected capacity of reservoir 10 is dependent on numerous physical factors, including, but not limited to, the desired output and efficiency of system 2. It is within the scope of the invention to employ duplicate reservoirs (not shown) rather than the divided reservoir 10*a* as shown in FIG. 2.

A pair of conduits or penstocks 20*a* are selectively in fluid communication with separate ports 22*a* which are provided in the lower portion of the pair of inlet water intakes 8*a'*. Electrically controlled valves 24*a* are respectively mounted in ports 22*a* to control the separate flows of water into the respective conduits or penstocks 20*a*. A sealed turbine housing 30*a* is mounted adjacent the reservoir 10*a* and receives a portion of both conduits or penstocks 20*a* with suitable sealing between the interior of housing 30*a* and the surrounding water. An electric turbine 32 of conventional design for generating electricity is operative mounted with in housing 30*a* and has turbine blades 32*a'* respectively mounted for rotation within each of the conduits or penstocks 20*a* in a known manner. It is within the scope of the invention to employ multiple turbine electric generators (not shown) in association with each conduit or penstock 20*a*, if desired. The pair of conduits or penstocks 20*a* pass in and out of the turbine housing 30*a* and are in selective fluid communication with separate intake ports 34*a* in communication with chambers 16*a*, 16*b* of reservoir 10*a*. A pair of electrically controlled flow valves 36*a* are provided in operative relationship to intake ports 34*a* to selectively create a flow of water through either of the pair of conduits or penstocks 20*a* and drive the turbine generator 32, whereby the separate flows of water effect successive cycles of the generation of electricity. The generation of electricity of the system 2*a* is based on the same principle as the system 2 of FIG. 1. The rapid flow of water through conduits or penstocks 20*a* is derived from the pressure differential existing between the separate air filled chambers 16*a,b* and the water intakes 8*a*' due to the head of water existing above the reservoir 10*a*. From the foregoing it should be apparent that the two successive separate flows of water through conduits or penstocks 20*a* occur when valves 24*a* and 36*a* which are respectively operatively connected to the separate conduits are opened.

A pair of air inlet tubes 50*a* are each operatively connected at their upper end above the surface of the water to air pressure pumps 52*a*, 52*b* that are mounted on platform 4. The air pressure pumps 52*a*, 52*b* are of same type as described with reference to the embodiment of FIG. 1. The air inlet tubes 50*a* extend downward and are each coupled in fluid communication with a respective chamber 16*a*, 16*b* of reservoir 10*a* through respective air inlet ports 58*a*. The inlet ports 58*a* each having an electrically operated, one way valve 58*a*'. A pair of reservoir air outlet tubes 60*a* are respectively connected to air outlet ports 62*a* of one of chambers 16*a*, 16*b*. The outlet tubes 50*a* extend upward in connected relationship to platform 6*a* and terminate with an air outlet 64*a* to exhaust air from the chambers 16*a*, 16*b* of reservoir 10*a* to which they are connected during the successive generating cycles. Valves 66*a* are respectively mounted in reservoir outlet ports 64*a* which open in concert to the opening of valves 24*a* and 36*a*. A pair of electrically powered doors 70*s* opening and closing a water outlet 72*a* to each chamber 16*a*, 16*b* are mounted on reservoir 10*a*. The doors 70 are used to empty a chamber 16*a*, 16 *b* after they has been generally filled with water following the two successive electricity generating cycles. The two sliding doors 70*a* alternatively can comprise conventional valves if desired. A conventional computer device 80 is electrically connected to electrically operated valves 24*a*, 36*a*, 58*a*' and 66*a* and to sliding door 70 to open and close the respective devices in conjunction with the successive duplicate power generating cycles of system 2*a*.

In operation of the system of FIG. 2*a*, during the alternate non-generating cycles with either of the chambers 16*a*, 16*b* of the reservoir 10*a* being generally full of water after the respective generating cycles, one of the air pumps 50*a*, 50*b* is actuated by computer 80 and pumps air at predetermined pressure through air inlet tube 50*a* and into the water filled chamber 16*a* or chamber 16*b*. At the same time the particular sliding door 70*a* communicating with the water filled chamber opens outlet 72*a* while valves 24*a*, 36*a* and 66*a* remain closed. The air flow created by either pump 52*a* or air pump 52*b* forces the water out of the respective chamber 16*a* or chamber 16*b* through either of the water outlets 72*a*. Once that particular chamber 16*a* or chamber 16*b* is substantially filled with air, the sliding door 70*a* moves to close outlet 72*a* and seal the associated chamber 16*a* or chamber 16*b* while at the same time the operating air pump 52*a* or pump 52*b* ceases operation with a valve 58*a*' closing. The valves 24*a*, 36*a*, and 66*a* associated with the then emptied chamber 16*a* or chamber 16*b* are thereupon opened at generally the same time. Water rapidly falls into water intake 8*a*' and downward through one of conduits or penstocks 20*a* associated with the emptied chamber 16*a*, 16*b*. After water flow is then established through the one of the conduits or penstocks 20*a* connected to the emptied chamber 16*a* or chamber 16*b*, the blades 32*a*' within the turbine housing 30 are rotated to drive electric generator 32. Subsequently, the water falls into either chamber 16*a*, 16*b* forcing air out through the air outlet tube 60*a* connected to chamber 16*a* or chamber 16*b* that is being filled with water. Once the chamber 16*a* or chamber 16*b* is generally filled with water as determined by water level detector 17*a* or 17*b*, the associated valves 24*a*, 36*a* and 66*a* are closed and the previous cycle of forcing water from a filled chamber of reservoir 10 is repeated. It should be clear that the system 2 provides duplicate successive cycles of power generation and removal of water from a respective chamber 16*a* or chamber 16*b*.

What is claimed is:

1. A system for generating hydroelectric power beneath the surface of a body of water at a predetermined depth comprising a reservoir mounted in the body of water beneath the surface of the body of water, said reservoir having an internal chamber being selectively filled with air, a water conduit extending generally upward from said reservoir to an upper portion and being in selective fluid communication with said chamber, a submerged water intake connected at a position on an upper portion of said conduit, said water intake being in selected fluid communication with said conduit, said water intake establishing a pressure differential between said intake position and said air filled chamber for creating a flow of water through said conduit into said chamber in a first cycle, an electric turbine generator being operatively connected to said conduit and arranged to generate electricity in response to the flow of water through said conduit, a controller operatively connected to said water intake and said reservoir, said controller establishing the flow of water between said water intake and said chamber to generate electricity during said first cycle, said controller capable of closing the flow of water through said conduit upon said chamber being generally filled with water to begin a second cycle of operation, and an air pump, connected to said reservoir to establish a flow of air into said chamber for forcing water from said generally filled chamber through an outlet into the body of water during said second cycle while said flow of water through said conduit is closed.

2. The system for generating hydroelectric power according to claim 1 further comprising an air inlet tube in fluid communication with said air pump and chamber for introducing said flow of air into said chamber.

3. The system for generating hydroelectric power according to claim 2 wherein said controller is further operatively connected to said outlet from said reservoir, said controller ceasing the flow of air through said air inlet tube and the flow of water from said chamber through said reservoir outlet upon a substantial amount of water being forced from said chamber to end said second cycle of operation.

4. The system for generating hydroelectric power according to claim 2 further including an air outlet tube extending from said chamber upward to an outlet above the surface of water for exhausting air from said chamber during said first cycle, said controller being operatively connected to said air outlet tube to cease flow of air through said air outlet tube during said second cycle.

5. The system for generating hydroelectric power according to claim 4 wherein said controller establishes a new flow of water through said conduit and a flow of exhaust air through said air outlet tube after the second cycle is ended to repeat said first cycle.

6. A system for generating hydroelectric power beneath the surface of a body of water at a predetermined depth comprising a reservoir mounted in the body of water beneath the surface of the body of water, said reservoir having an internal chamber being selectively filled with air, a water conduit extending generally upward from said reservoir to an upper portion and being in selective fluid communication with said chamber, a submerged water intake connected at a position on an upper portion of said conduit, said water intake being in selected fluid communication with said conduit, said water intake establishing a pressure differential between said intake position and said air filled chamber for creating a flow of water through said conduit into said chamber in a first cycle, an electric turbine generator being operatively connected to said conduit and arranged to generate electricity in response to the flow of water through said conduit, a controller operatively connected to said water intake and said reservoir, said controller for establishing the flow of water between said water intake and said chamber to generate electricity during said first cycle, means controller capable of closing the flow of water through said conduit upon said chamber being generally filled with water to begin a second cycle of operation, an air pump, connected to said reservoir to establish a flow of air into said chamber for forcing water from said generally filled chamber through an outlet into the body of water during said second cycle while said flow of water through said conduit is closed, an air inlet tube in fluid communication with said air pump and chamber for introducing said flow of air into said chamber, and a platform supported above the surface of the body of water, said platform carrying said water intake and said conduit, said air pump being supported on said platform.

7. The system for generating hydroelectric power according to claim 6 wherein said air pump is electrically energized by rotating wind vanes, said air outlet includes an outlet situated adjacent said vanes for rotating said vanes during said first cycle and re-charging said air pump.

8. The system for generating hydroelectric power according to claim 7 further comprising a computer operatively connected to said controller and said air pump, said computer ceasing the pumping of air by said air pump during said first cycle and effecting the airflow during said second cycle.

9. The system for generating hydroelectric power according to claim 1 further comprising a sealed air filled turbine housing for enclosing said electric turbine generator, a portion of said conduit passing through said turbine housing, said turbine generator having means subjected to the flow of water through said conduit for causing the generation of electricity.

10. A system for generating hydroelectric power beneath the surface of a body of water at a predetermined depth comprising:

a reservoir mounted in the body of water beneath the surface of the body of water, said reservoir having a plurality of internal chambers being selectively filled with air, a plurality of water conduits being respectively in fluid communication with said plurality of chambers, said water conduits each extending generally upward from said reservoir to upper portions, a plurality of submerged water intakes respectively connected at a position on said upper portions of said plurality of conduits, said water intakes each being in selected fluid communication with one of said plurality of conduits, said water intakes establishing a pressure differential between said intake position and said air filled chambers for creating a flow of water through a selected one of said plurality of conduits into a respective one of said plurality of chambers during one of a plurality of electric generation cycles associated with a selected one of said conduits being subjected to a flow of water, at least one electric turbine generator being operatively connected to said plurality of conduits and arranged to generate electricity in response to the flow of water through said plurality of conduits, a controller operatively connected to said water intakes and said reservoir for establishing the flow of water through a selected one of said conduits between said water intakes and at least one of said chambers to generate electricity during one electric generation cycle, said controller sequentially closing the flow of water through said selected one of said plurality of conduits upon said respective one of said chambers being generally filled with water to end said one electric generation cycle and said fluid control at least one valve, establishing flow of water through another one of said plurality of conduits to generate electricity during another electric generation cycle, an air pump operatively coupled to said plurality of chambers of said reservoir to establish a flow of air into said one of said chambers having been generally filled with water, said flow of air for forcing water from said one of said chambers through one of a plurality of reservoir outlets into the body of water during a non-generation cycle.

11. The system for generating hydroelectric power according to claim 10 wherein said air pump includes a plurality of air pumps and a plurality of air inlet tubes being in fluid communication with a respective one of said plurality of chambers for introducing said flow of air into said respective one chamber.

12. The system for generating hydroelectric power according to claim 11 wherein said controller is operatively connected to said reservoir outlet and blocks the flow of air through one of said of air inlet tubes and the flow of water from said respective one chamber upon a substantial amount of water being forced from said respective one chamber to end said non-generating cycle of operation.

13. The system for generating hydroelectric power according to claim 10 further including a plurality of air outlet tubes extending from respectively from said plurality of chambers upward to an outlet above the surface of water for exhausting air from a respective one of said chambers during said electric generation cycle, said controller being operatively connected to said air outlet tubes to cease flow of air through said air outlet tube after said non-generation electric generation cycle ends.

* * * * *